United States Patent
Weber et al.

(10) Patent No.: US 11,193,020 B2
(45) Date of Patent: Dec. 7, 2021

(54) POLYARYLENE ETHER SULFONE COMPRISING NAPHTHALIC ACID ANHYDRIDE ENDGROUPS

(71) Applicant: BASF SE, Ludwigshafen am Rhein (DE)

(72) Inventors: Martin Weber, Ludwigshafen (DE); Helmut Reichelt, Ludwigshafen (DE); Stefan Schwiegk, Ludwigshafen (DE); Gad Kory, Gaiberg (DE); Christian Maletzko, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 215 days.

(21) Appl. No.: 16/482,582

(22) PCT Filed: Jan. 18, 2018

(86) PCT No.: PCT/EP2018/051160
§ 371 (c)(1),
(2) Date: Jul. 31, 2019

(87) PCT Pub. No.: WO2018/141552
PCT Pub. Date: Aug. 9, 2018

(65) Prior Publication Data
US 2020/0010680 A1    Jan. 9, 2020

(30) Foreign Application Priority Data
Feb. 1, 2017    (EP) ..................... 17154116

(51) Int. Cl.
*C08L 81/06* (2006.01)
*C08G 75/23* (2006.01)
*C08J 5/18* (2006.01)
*C08L 77/06* (2006.01)

(52) U.S. Cl.
CPC .............. *C08L 81/06* (2013.01); *C08G 75/23* (2013.01); *C08J 5/18* (2013.01); *C08L 77/06* (2013.01); *C08J 2377/06* (2013.01); *C08J 2381/06* (2013.01); *C08J 2477/06* (2013.01); *C08J 2481/06* (2013.01); *C08L 2203/12* (2013.01); *C08L 2203/16* (2013.01); *C08L 2205/025* (2013.01); *C08L 2205/03* (2013.01); *C08L 2205/035* (2013.01)

(58) Field of Classification Search
CPC ...... C08L 81/06; C08J 2381/06; Y10S 525/90
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck et al. | |
| 3,431,240 A | * 3/1969 | Oien | C07C 65/40 528/125 |
| 3,651,014 A | 3/1972 | Witsiepe | |
| 5,504,182 A | * 4/1996 | Cherdron | C08G 69/32 528/125 |
| 5,998,533 A | * 12/1999 | Weber | C08G 75/23 524/540 |
| 6,194,538 B1 | 2/2001 | Weiss et al. | |
| 6,476,182 B1 | * 11/2002 | Auman | C08G 73/1014 528/125 |

FOREIGN PATENT DOCUMENTS

| | | |
|---|---|---|
| CN | 102746511 | * 10/2012 |
| CN | 103382305 A | 11/2013 |
| DE | 103 13 681 A1 | 10/2004 |
| EP | 0 038 094 A2 | 10/1981 |
| EP | 0 038 582 A2 | 10/1981 |
| EP | 0 039 524 A1 | 11/1981 |
| EP | 0 129 195 A2 | 12/1984 |
| EP | 0 129 196 A2 | 12/1984 |
| EP | 0 208 187 A2 | 1/1987 |
| EP | 0 299 444 A2 | 1/1989 |
| EP | 0 840 758 A1 | 5/1998 |
| EP | 0 922 065 A2 | 6/1999 |
| EP | 1 198 491 A1 | 2/2002 |
| EP | 1 944 075 A1 | 11/2008 |
| WO | WO 92/09648 | 6/1992 |
| WO | WO 97/04018 | 2/1997 |
| WO | WO 2014/030657 A1 | 2/2014 |

OTHER PUBLICATIONS

USPTO structure search, Aug. 2021.*

(Continued)

*Primary Examiner* — Gregory Listvoyb
(74) *Attorney, Agent, or Firm* — Grüneberg and Myers PLLC

(57) ABSTRACT

A polyarylene ether sulfone comprising endgroups of formula (I), a process for its manufacture, a molding composition comprising the polyarylene ether sulfone, use of the molding composition and fiber, film or shaped article produced using the molding composition.

(I)

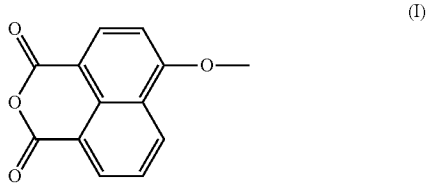

9 Claims, No Drawings

(56) References Cited

OTHER PUBLICATIONS

European Search Report dated Aug. 3, 2017, in Patent Application No. 17154116.2, 4 pages (with English Translation of Category of Cited Documents).
International Search Report dated Apr. 17, 2018 in PCT/EP2018/051160 filed Jan. 18, 2018.

* cited by examiner

POLYARYLENE ETHER SULFONE COMPRISING NAPHTHALIC ACID ANHYDRIDE ENDGROUPS

The present invention relates to polyarylene ether sulfones having anhydride endgroups.

Polyarylene ethers are classified as high-performance thermoplastics. Polyarylene ethers may have—depending on how they are produced—for instance hydroxy, halogen, amino, epoxy or anhydride endgroups. EP 840 758 A discloses polyarylene ethers with phthalic acid anhydride endgroups. These are obtained by reacting a hydroxy endgroup containing polyarylene ether with halogen substituted phthalic acid anhydride in the presence of potassium fluoride. EP 840 758 A further discloses that the so obtained polyarylene ethers are useful for molding compositions comprising polyamide.

The problem addressed by the present disclosure is to present new polyarylene ether sulfones as well as compositions comprising said polyarylene ether sulfones. In addition, the present disclosure was to point to blends or alloys of said polyarylene ether sulfones with other polymers. Moreover, the polyarylene ether sulfones should support the manufacture of films, fibers and shaped articles based on mixtures comprising polyarylene ether sulfones and polyamide which are high temperature resistant, having good chemical resistance as well as a good current tracking index (CTI). Further, a process for the manufacture of said new polyarylene ether sulfones should be provided.

Hereinunder a polyarylene ether sulfone is disclosed which comprises endgroups of formula I

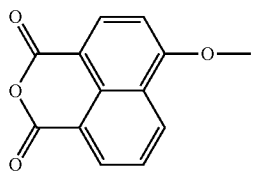

(I)

Further, a process for the manufacture of a polyarylene ether sulfone comprising endgroups of formula I is disclosed which comprises reacting a polyarylene ether sulfone comprising phenolate endgroups with 4-chloro-1,8-naphthalic acid anhydride. In addition a process is encompassed wherein the polyarylene sulfone comprising endgroups of formula I is obtained comprising reacting polyarylene ether sulfone forming monomers with 4-chloro-1,8-naththlalic acid anhydride. The use of said, respectively the so obtained, polyarylene ether sulfone for the manufacture of a composition is also disclosed herein. The present disclosure also pertains to a composition comprising said, respectively the so obtained, polyarylene ether sulfone. In addition, this disclosure encompasses the use of the composition for the manufacture of a fiber, film or shaped article as well as a fiber, film or shaped article produced using the composition.

In the following "at least one" may in general mean one or two or more, such as three or four or five or more, wherein more may mean a plurality or an uncountable. For instance, it may mean one or a mixture of two or more. If used in connection with chemical compounds "at least one" is meant in the sense that one or two or more chemical compounds differing in their chemical constitution, that is chemical nature, are described.

In the following "polymer" may mean homopolymer or copolymer or a mixture thereof. The person skilled in the art appreciates that any polymer, may it be a homopolymer or a copolymer by nature typically is a mixture of polymeric individuals differing in their constitution such as chain length, degree of branching or nature of endgroups. Thus in the following "at least one" as prefix to a polymer means that different types of polymers may be encompassed whereby each type may have the difference in constitution addressed above.

For the purposes of the present invention, a rubber is generally either a crosslinkable polymer or a flexible, low Tg-polymer having elastomeric properties at room temperature.

In the following a polyarylether comprising endgroups of formula I may also be termed "PNA".

Polyarylene ether sulfones are a class of polymers known to a person skilled in the art. In principle, a polyarylene ether sulfone of any structure is encompassed by the present disclosure provided that the polyarylene ether sulfone comprises endgroups of formula I.

It may be preferred that the PNA is composed of units of the general formula II

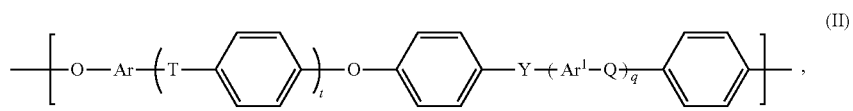

(II)

where the definitions of the symbols t, q, Q, T, Y, Ar and $Ar^1$ are as follows:

t, q: independently of one another 0, or 1, or 2, or 3,

Q, T, Y: independently of one another in each case a chemical bond or group selected from —O—, —S—, —SO2-, S=O, C=O, —N=N—, and —CRaRb—, where Ra and Rb independently of one another are in each case a hydrogen atom or a C1 to C12-alkyl, C1 to C12-alkoxy, C3 to C12-cycloalkyl, or C6 to C18-aryl group, and where at least one of Q, T, and Y is —SO2-, and Ar and $Ar^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it may be preferable that Q, T, and Y in formula II are selected independently of one another from —O— and —SO2-, with the proviso that at least one of the group consisting of Q, T, and Y is —SO2-.

If Q, T, or Y is —CRaRb—, Ra and Rb independently of one another are in each case a hydrogen atom or a C1 to C12-alkyl, C1 to C12-alkoxy, or C6 to C18-aryl group.

It may be preferred that C1 to C12-alkyl comprises linear and branched, saturated alkyl groups having from 1 to 12 carbon atoms. The following moieties may be mentioned in particular: C1 to C6-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned C1 to C12-alkoxy groups are for instance the alkyl moieties defined above having from 1 to 12 carbon atoms.

C3 to C12-cycloalkyl may in particular comprise C3 to C8 cycloalkyl, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar1 are independently of one another a C6 to C18-arylene group. It may be preferable that Ar derives from an electron-rich aromatic substance that is very susceptible to electrophilic attack, whereby it may be preferably hydroquinone, resorcinol, dihydroxynaphthalene, in particular it may be 2,7-dihydroxynaphthalene, or 4,4'-bisphenol. Ar1 may preferably be an unsubstituted C6- or C12-arylene group.

It may particularly be preferred that C6 to C18-arylene groups Ar and Ar1 are phenylene groups, and independently of one another e.g. 1,2-, 1,3-, and 1,4-phenylene, naphthylene groups, e.g. 1,6-, 1,7-, 2,6-, or 2,7-naphthylene, or also the arylene groups that derive from anthracene, from phenanthrene, or from naphthacene.

It may be preferable that Ar and Ar1 are independently of one another 1,4-phenylene, 1,3-phenylene, naphthylene, in particular 2,7-dihydroxynaphthalene, or 4,4'-biphenylene.

It may be preferred that the PNA comprises at least one of the following repeat units IIa to IIo:

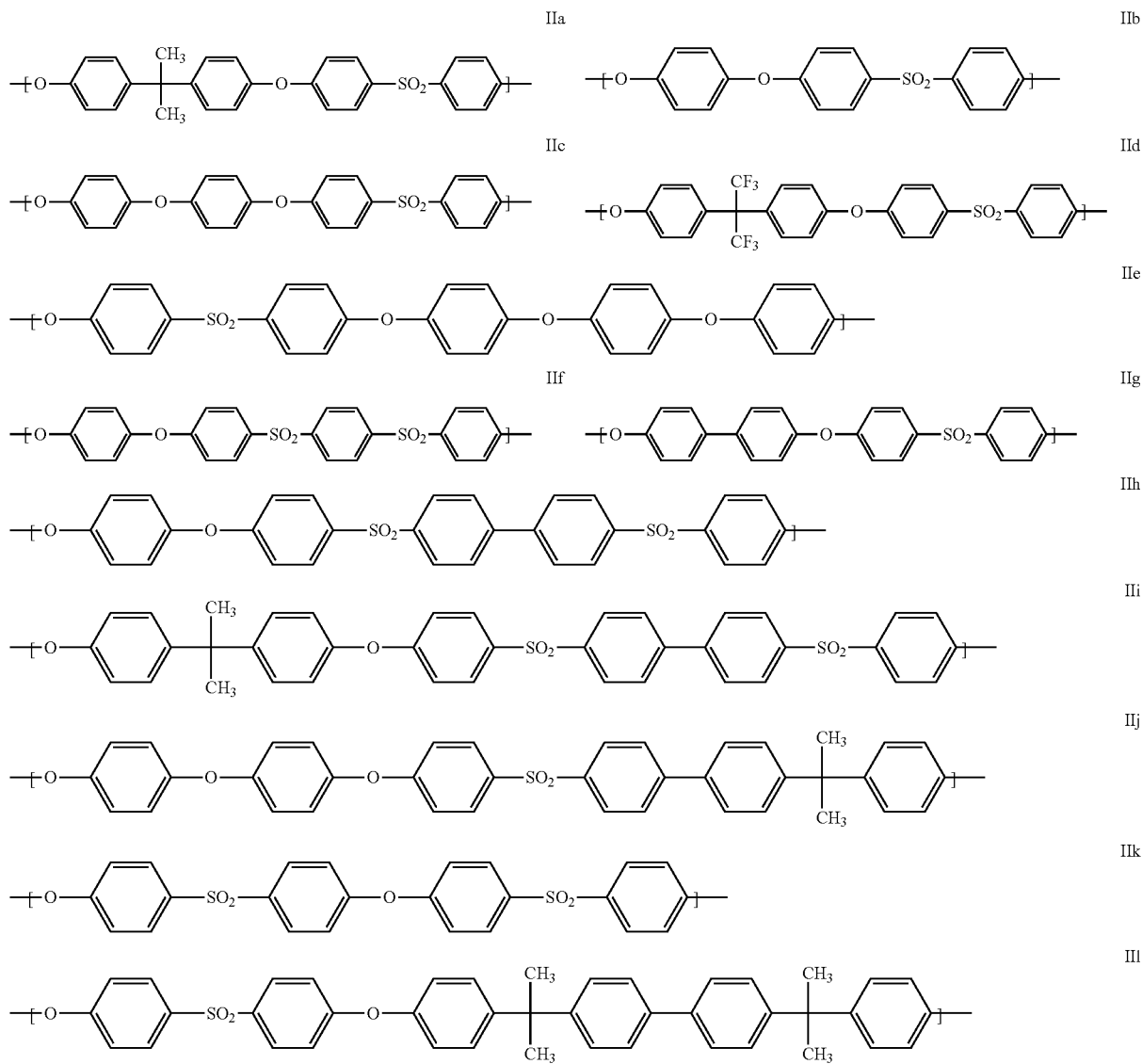

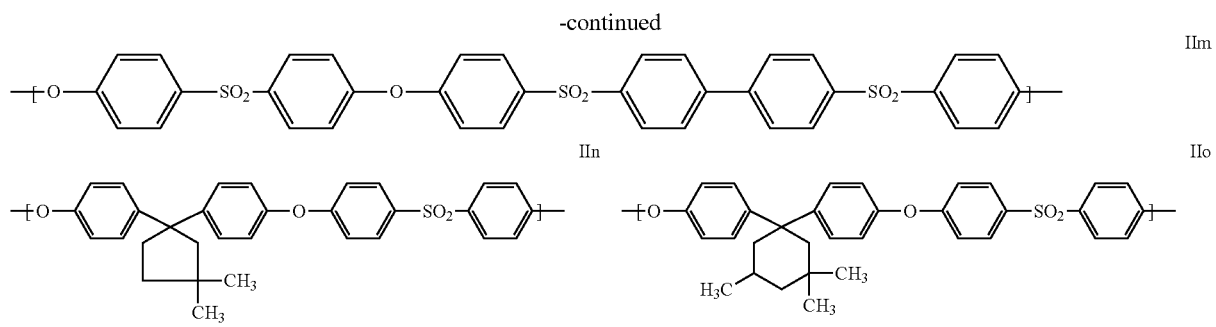

Other repeat units, in addition to the units IIa to IIo that may preferably be present, are those in which one or more 1,4-phenylene units deriving from hydroquinone have been replaced by 1,3-phenylene units deriving from resorcinol, or by naphthylene units deriving from dihydroxynaphthalene.

Units of the general formula II that may be particularly preferred are the units IIa, IIg, and/or IIk. It may also be particularly preferable that the PNA is in essence composed of one type of unit of the general formula II, whereby one type may in particular be selected from IIa, IIg, and IIk.

The PNA may particularly preferably be composed of repeat units where Ar is 1,4-phenylene, t is 1, q is 0, T is a chemical bond, and Y is SO2. This polyarylene ether sulfone is also termed polyphenylene sulfone (PPSU-NA) (formula IIg).

The PNA may particularly preferably be composed of repeat units where Ar is 1,4-phenylene, t is 1, q is 0, T is C(CH3)2, and Y is SO2. This polyarylene ether sulfone is also termed polysulfone (PSU-NA) (formula IIa).

The PNA may particularly preferably be composed of repeat units where Ar is 1,4-phenylene, t is 1, q is 0, T and Y are SO2. This polyarylene ether sulfone is also termed polyether sulfone (PESU-NA) (formula IIk).

For the purposes of the present disclosure, abbreviations such as PPSU, PESU, and PSU are in accordance with DIN EN ISO 1043-1:2001.

The polyarylene ether sulfone comprises end groups of formula I

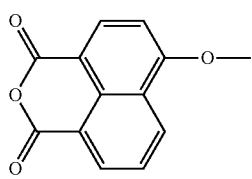

(I)

It may be possible that the PNA is branched and has more than one end group per individual polymer chain. Typically, the PNA is linear and has two end groups per individual polymer chain.

The amount of end groups of formula I can be small or very small, that is only few of the end groups are endgroups of formula I. It is possible that 100% or almost 100% end groups, that is all or almost all end groups, are end groups of formula I. It may be preferred that the polyarylether sulfone comprises at least 10% endgroups of formula I, or in other words that at least ten of 100 end groups are end groups of formula I. In the case the PNA is linear mathematically at least every fifth individual polymer chain has one end group of formula I or that at least every tenth individual polymer chain has two end groups of formula I. The person skilled in the art appreciates that in practice other distributions fulfill the requirement. It may be preferred that at least 25%, that is at least 25 of 100 end groups are end groups of formula I. Any percentage of end groups between 10% and 100% may be end groups of formula I, such as 30%, 40%, 50% 60%, 70%, 80% or 90% or any uneven percentage in between 10% and 100%. It may be preferred that from 10% to 90% end groups are end groups of formula I. It may be more preferred that from 15 to 90%, such as 25% to 80% end groups are end groups of formula I, for instance from 30% to 70%.

The nature of the end groups which are not end groups of formula I is not particularly limited. Generally, it may depend on if reactive or non-reactive end groups are desired in addition to the end groups of formula I. Reactive end groups may for instance be preferred if it is intended to polymerize the PNA with at least one further monomer or polymer to yield a copolymer or a polymer network. Possible end groups which are not end groups of formula I are phenolic OH end groups or phenolate end groups, phenolic alkoxy end groups, among which —OCH3 end groups may be preferred, amino end groups, among which —NH2 may be preferred, halogen end groups, which can in particular be —F or —Cl. Cl may be most preferred among the halogen end groups. It is also possible that the end groups which are not end groups of formula I are phenolic anhydride end groups. The end groups which are not end groups of formula I can be of one type or can be different from each other. Generally it may be preferred that the end groups other than those of formula I are Cl—, OH— and OCH3.

For example the PNA listed in Table 1 may be particularly preferred

TABLE 1

| Polyarylene ether sulfone | % endgroups formula I | Further endgroups |
|---|---|---|
| PPSU-NA | 15 to 30 | Cl, OH |
| PPSU-NA | 15 to 30 | OH, OCH3 and Cl |
| PPSU-NA | 40 to 80 | OH, Cl |
| PPSU-NA | 40 to 80 | OH, OCH3 and Cl |
| PESU-NA | 25 to 50 | Cl, OH |
| PESU-NA | 25 to 50 | OH, Cl, OCH3 |
| PESU-NA | 40 to 90 | Cl, OH |
| PESU-NA | 40 to 90 | OH, Cl, OCH3 |
| PSU-NA | 20 to 40 | CL, OH |
| PSU-NA | 20 to 40 | OH, Cl, OCH3 |
| PSU-NA | 30 to 75 | Cl, OH |
| PSU-NA | 30 to 75 | OH, Cl, OCH3 |

The weight-average molar mass Mw of the PNA may preferably be from 10 000 to 150 000 g/mol, in particular it may be from 15 000 to 120 000 g/mol and it may be particularly preferably from 18 000 to 100 000 g/mol, determined by means of gel permeation chromatography in dimethylacetamide as solvent against narrowly-distributed polymethyl methacrylate as standard (calibration between 800 to 1820000 g/mol), using 4 columns (pre-column, 3 separation columns based on polyestercopolymers) operated at 80° C. The flow rate was set to 1 ml/min, injection volume was 100 μl. Detection was done using an RI-detector.

The molecular weight distribution (MWD) of the polymers is 2.0 to 6, preferably between 2.2 and 4.5.

The apparent melt viscosity at 350° C./1150 s-1 of the PNA may preferably be from 50 to 500 Pas, with a possible preference from 150 to 275 Pas. Flowability can be assessed on the basis of melt viscosity. Melt viscosity is determined by means of a capillary rheometer. Apparent viscosity at 350° C. is determined here as a function of shear rate in a capillary viscometer (Göttfert Rheograph 2003 capillary viscometer) using a circular capillary of length 30 mm, radius 0.5 mm, an inlet angle of 180° for the nozzle, a diameter of 12 mm for the melt reservoir vessel, and a preheating time of 5 minutes. The values stated are determined at 1150 $s^{-1}$.

The polyarylene ether sulfone comprising endgroups of formula I can be prepared by a process comprising reacting a polyarylene ether sulfone comprising phenolate end groups with 4-chloro-1,8-naphthalic acid anhydride. The amount of the end groups being phenolate end groups generally will depend on the desired amount of end groups of formula I. Thus it can be small or very small, that is only few of the end groups are phenolate end groups. It is possible that 100% or almost 100% end groups, that is all or almost all end groups, are phenolate end groups. Consequently, it may be preferred that at least 25%, that is at least 25 of 100 end groups are phenolate end groups. Any percentage of end groups between 10% and 100% may be phenolate end groups, such as 30%, 40%, 50% 60%, 70%, 80% or 90% or any uneven percentage in between 10% and 100%. It may be preferred that from 10% to 90% end groups are phenolate end groups. It may be more preferred that from 25% to 90% phenolate end groups are end groups, for instance from 30% to 70.%. The content of OH/O⁻ endgroups can be determined by potentiometric titration of the polymer after neutralization and precipitation using NH₄OH in DMF as solvent.

The polyarylene ether sulfone comprising phenolate end groups may be prepared by any suitable method. Such methods are either known to the person skilled in the art or are accessible to him by application of his general knowledge. Production processes that lead to a polyarylene ether sulfone are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443. More details regarding the synthesis of OH-terminated polyarylene ether sulfones are for instance given in R. Viswanathan, B. C. Johnson, J. E. McGrath, Polymer 25 (1984) 1827.

Particular preference may be given to the reaction between at least one aromatic compound having two halogen substituents and at least one aromatic compound having two functional groups reactive toward abovementioned halogen substituents. Said at least one aromatic compound may be monomeric or oligomeric or polymeric. For example, in order to obtain block copolymers, it may be possible to react at least one polymeric aromatic compound with at least one monomeric aromatic compound. Typically, it may be preferred to carry out the reaction in at least one aprotic polar solvent, such as dimethylsulfone, dimethylsulfoxide, diphenylsulfone, dimethylacetamide or N-methylpyrrolidone or any combination thereof. It may be preferred to use one solvent. It may be most preferred to carry out the reaction in N-methylpyrrolidone. While the reaction can be carried out using a co-solvent which forms an azeotrope with water for instance toluene or chlorobenzene it is typically preferred not to employ such a co-solvent. It may also be possible to carry out the polymerization in absence of a solvent. Generally, the reaction can be carried out in the presence of at least one base. It may be preferred that it is carried out in the presence of at least one anhydrous alkali metal carbonate, where one may be preferred, in particular sodium carbonate, potassium carbonate, calcium carbonate, or a mixture thereof, very particularly preferably potassium carbonate. One particularly suitable combination may be N-methylpyrrolidone as solvent and potassium carbonate as base. To accelerate the reaction or achieve high conversion, it can be advantageous to use potassium carbonate of a particle size (volume average, measured by light scattering) below 100 μm, more preferably below 50 μm.

The molecular weight of the polyarylene ether sulfone comprising phenolate end groups can be adjusted using a defined off-set of the stoichiometric ratio between the OH— and the Cl-monomer, as described in A. Noshay, M. Matzner, C. N. Merriam, J. Polym. Sci. A-1 9 (1971) 3147. Usually an excess OH-monomer is applied to have phenolate-endgroups for the subsequent conversion. This usually leads to polyarylene ether sulfones having 1.8 to 2 phenolate-endgroups per chain if a high conversion is obtained (>95%). Another way to control the molecular weight of the phenolate-terminated polyarylene ether sulfone is possible by monitoring the viscosity increase during the reaction. This approach can be used if polyarylene ether sulfones of a dedicated Mn with less than 2 phenolate endgroups are prepared.

The reaction between the polyarylene ether sulfone comprising phenolate end groups with 4-chloro-1,8-naphthalic acid anhydride may preferably also be carried out in the presence of at least one aprotic solvent, whereby the abovementioned are typically preferred. Generally, this reaction may be carried out in the presence of at least one base, whereby the above-mentioned bases are typically preferred. One particularly suitable combination may be N-methylpyrrolidone as solvent and potassium carbonate as base.

It may be more preferred that the polyarylene ether sulfone comprising end groups of formula I is obtained in a one-pot synthesis from the respective polyarylene ether sulfone forming monomers. Thereby it may be preferred that a phenolate is formed first via reacting an excess of at least one monomer having hydroxy groups with at least one base in the presence of at least one solvent prior to contacting the obtained mixture with at least one monomer having halogen groups. It may be preferred that the at least one monomer having halogen groups is added to said mixture. Thereby it may be preferred reacting a monomer having two hydroxy groups with a monomer having two halogen groups, whereby two chlorine groups may be preferred.

Said at least one base can typically be a hydroxide, carbonate or bicarbonate. Thus it may be a mixture of at least one hydroxide and at least one carbonate or a mixture of at least one bicarbonate with at least one bicarbonate. Thereby at least one anhydrous alkali metal carbonate may be preferred. It may be preferred to use one base. It may be preferred that the one base is one alkali metal carbonate. In particular sodium carbonate, potassium carbonate, calcium carbonate, or a mixture thereof may be preferred, very particularly it may be preferred that potassium carbonate is used as the base. It may be advantageous to use an excess of base relative to the monomeric hydroxy groups. Said excess may for instance be from 1 to 25 mol %.

It may be preferred that the reaction is carried out in at least one aprotic polar solvent, where one may be preferred. Typically, it is preferred to carry out the reaction in at least one aprotic polar solvent, such as dimethylsulfone, dimethylsulfoxide, diphenylsulfone, dimethylacetamide or N-methylpyrrolidone or any combination thereof, whereby N-methylpyrrolidone may be the preferred one. To separate the water released during the reaction either an azeotrope-forming co-solvent like toluene or chlorobenzene may be used. Typically, it may be preferred not to employ such azeotrope-forming co-solvent. Separation of the water together with the solvent during the heating process may generally be preferred. Loss of solvent can be accounted for by for instance adding solvent during the reaction.

One particularly suitable combination may be N-methylpyrrolidone as solvent and potassium carbonate as base. Thereby it may be preferred to use an excess of 1 to 25 mol % of potassium carbonate based on the monomeric hydroxy groups.

While the person skilled in the art may adapt the reaction temperatures and times to the specific polyarylene ethers to be produced reaction temperatures in the range of from 180 to 205° C. may be applicable and temperatures from 185 to 195° C. may be preferred. At the latter temperatures the reaction may take from 3 to 12 hours, e.g. from 4 to 10 hours.

The reaction mixture is generally thereafter contacted with 4-chloro-1,8-naphthalic acid anhydride, whereby it may be preferred that the 4-chloro-1,8-naphthalic acid anhydride is added to the reaction mixture. It may be more preferred that the 4-chloro-1,8-naphthalic acid anhydride is added as a solution in at least one solvent, N-methyl-pyrrolidone being typically preferred. The temperature of the reaction mixture during contact, preferably addition, may preferably range from 150 to 205° C.

The charged amount of 4-chloro-1,8-naphthalic acid anhydride may be equivalent to the expected number of available phenolate units in the batch. It may be more preferred to use a 5 to 50 mol % excess of 4-chloro-1,8-naphthalic acid anhydride. It may also be advantageous to add 0 to 50 mol % (based on the amount of 4-chloro-1,8-naphthalic acid anhydride) of at least one base, whereby potassium carbonate may be preferred.

After the reaction is completed, further at least one solvent, which preferably may be N-methyl-pyrrolidone is typically added to cool the reaction mixture down preferably to temperatures around 80° C. At this temperature the reaction mixture, which typically is a dispersion, is taken out of the reaction unit, typically comprising a reaction vessel and transferred into a separation unit. Said separation unit may preferably comprise a filtration unit to separate the salt formed during the reaction, e.g. potassium chloride from product. Depending on the viscosity of the dispersion, this process may take minutes or hours such as from 30 min to 24 h. During that time the filtrate may also let to cool down to ambient temperature (23° C.). The product may then be isolated, such as via precipitation due to addition of a non-solvent. This can for instance be a mixture of water and at least one polar aprotic solvent. It may be preferred to use a mixture of water and N-methyl pyrrolidone, whereby the water is generally used in portions greater than the N-methyl-pyrollidone. Precipitation in a water/NMP-mixture (80/20 by weight) may be most preferred. The obtained powder is collected, typically filtered, and then typically washed and finally dried, whereby temperatures from 120 to 150° C. in the vacuum can be used.

Thus the general reaction scheme may preferably be

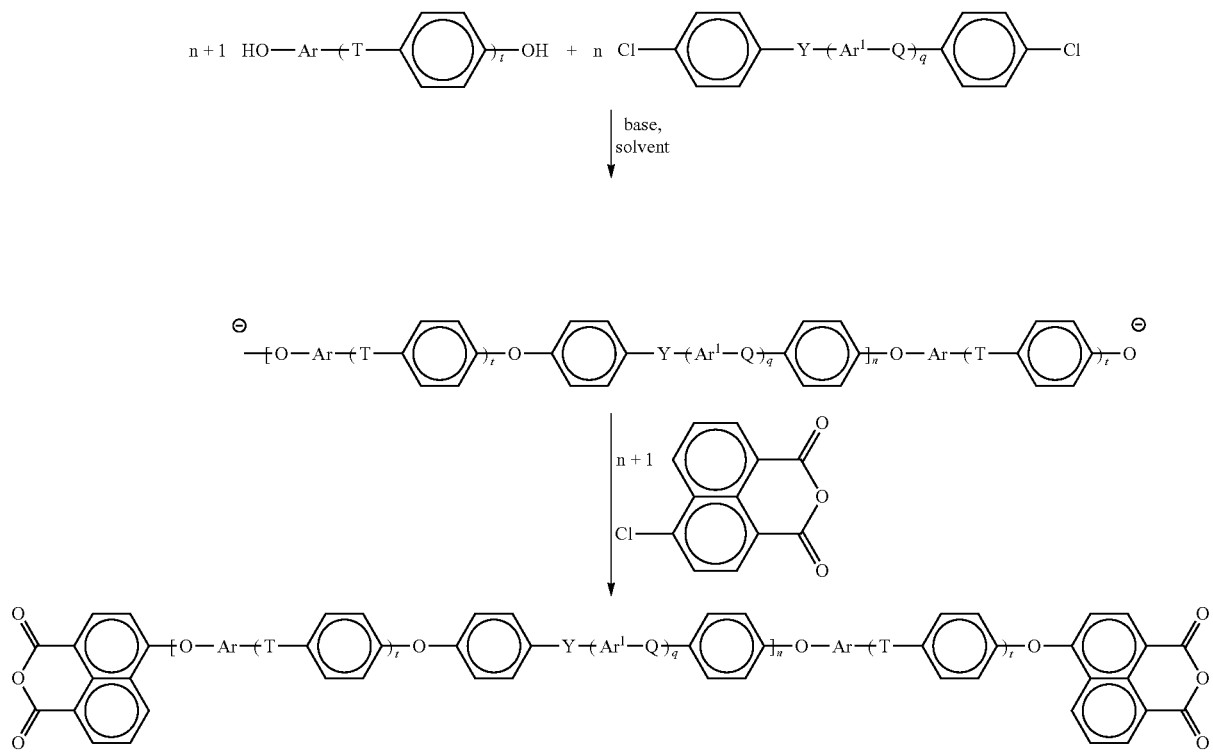

wherein the variables have the meaning as defined above and n may be from 3 to 180, preferably from 5 to 150 whereby it may be most preferred that n is from 7 to 100.

For example, PESU containing end groups of formula I may be obtained as depicted schematically:

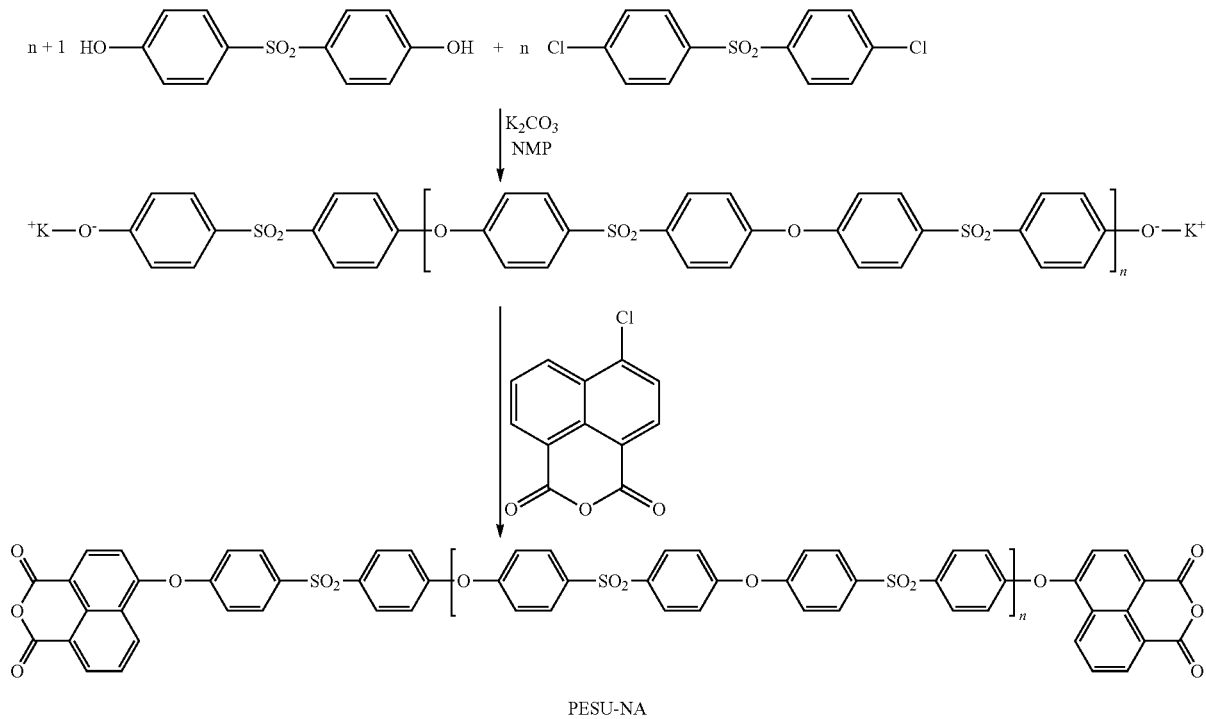

PESU-NA

It may be preferred that the molding composition comprises (A) from 5 to 95% by weight of at least one polyarylene ether sulfone comprising endgroups of formula I, (B) from 5 to 95% by weight of at least one polyamide, and optionally at least one further component, where the total of the proportions by weight of all components is 100%, based on the molding composition.

It may be preferred that the molding composition comprises (A) from 5 to 95% by weight of at least one PNA, whereby it may be more preferred that it comprises (A) from 7.5 to 50% by weight, such as from 10 to 30% by weight of at least one PNA. It may even be more preferred that the molding composition comprises (A) from 12.5 to 25% by weight of at least one PNA. Thereby the total proportions of all components is 100% by weight, based on the molding composition.

The at least one polyarylether sulfone comprising end groups of formula I used as component A in the moldings composition is described in detail above, including possible preferences in its structure. Thus the repeat units, the amount and the nature of end groups is as described above and the PNA listed in Table 1 may be particularly preferred.

As component B) the molding composition may preferably comprise from 0 to 90% by weight at least one polyamide, whereby it may be more preferably from 25 to 70 such as from 30 to 65% by weight. The molding composition even more preferably comprise (B) from 35 to 60% by weight of at least one polyamide. Thereby the total proportions of all components is 100% by weight, based on the molding composition.

The at least one polyamide contained in the molding composition disclosed herein generally has a viscosity number of from 90 to 350, which may preferably be from 110 to 240 ml/g determined in a 0.5 wt % solution in 96 wt % sulfuric acid at 25° C. in accordance with DIN EN ISO 307 (August 2013).

Preference is generally given to a at least one semicrystalline or amorphous resin having a molecular weight (weight average) of at least 5000, such as are described in U.S. Pat. Nos. 2,071,250, 2,071,251, 2,130,523, 2,130,948, 2,241,322, 2,312,966, 2,512,606 and 3,393,210.

Examples thereof include polyamides derived from lactams having 7 to 13 ring members, such as polycaprolactam, polycaprylolactam and polylaurolactam and also polyamides obtained by reacting at least one dicarboxylic acid with at least one diamine while others are possible.

Usable as the at least one dicarboxylic acid are alkanedicarboxylic acids having 6 to 12 and in particular 6 to 10 carbon atoms and aromatic dicarboxylic acids. Mention will be made here only of adipic acid, azelaic acid, sebacic acid, dodecanedioic acid and terephthalic and/or isophthalic acid as acids.

Suitable at least one diamine include in particular alkane diamines having 6 to 12 and in particular 6 to 8 carbon atoms and also m-xylylenediamine (MXDA) (for example a 1:1 molar ratio of MXDA with adipic acid), di-(4-aminophenyl) methane, di-(4-aminocyclohexyl)methane, 2,2-di-(4-aminophenyl)propane, 2,2-di-(4-aminocyclohexyl)propane and/or 1,5-diamino-2-methylpentane.

The at least one polyamide which may be preferred is polyhexamethylene adipamide, polyhexamethylene sebacamide or polycaprolactam or a mixture thereof. Also preferred may be copolyamides 6/66, especially with a proportion of caprolactam units of from 5 to 95 wt %.

Further suitable at least one polyamide is preferably obtainable from w-aminoalkyl nitriles, for example aminocapronitrile (PA 6) and adipodinitrile with hexamethylenediamine (PA 66) by so-called direct polymerization in the presence of water, as described in DE-A 10313681, EP-A 1198491 and EP 922065 for example.

Also useful at least one polyamide is typically obtainable, for example, by condensation of 1,4-diaminobutane with adipic acid at elevated temperature (polyamide-4,6). Production processes for polyamides having this structure are described in EP-A 38 094, EP-A 38 582 and EP-A 39 524 for example.

Also suitable at least one polyamide may be obtainable by copolymerization of two or more of the abovementioned monomers or mixtures of a plurality of polyamides in any desired mixing ratio. Particular preference is given to mixtures of polyamide 66 with other polyamides, in particular copolyamides 6/66.

Furthermore, at least one partially aromatic copolyamide such as PA 6/6T and PA 66/6T having a triamine content of generally less than 0.5 and typically preferably less than 0.3 wt % have often proven particularly advantageous (see EP-A 299 444). Further the at least one polyamide may be at least one high-temperature-resistant polyamide disclosed in EP-A 19 94 075 (PA 6T/6I/MXD6).

The at least one polyamide may preferably be at least one partly aromatic copolyamide having a low triamine content which may be produced by the processes described in EP-A 129 195 and 129 196.

The at least one polyamide which may be used as component (B) of the molding may be chosen from the following non-exhaustive list which contains the above cited, and also additional, polyamides:

AB polymers:

| | |
|---|---|
| PA 4 | pyrrolidone |
| PA 6 | ε-caprolactam |
| PA 7 | ethanolactam |
| PA 8 | capryllolactam |
| PA 9 | 9-aminopelargonic acid |
| PA 11 | 11-aminoundecanoic acid |
| PA 12 | laurolactam |

AA/BB polymers:

| | |
|---|---|
| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA 9T | 1,9-nonanediamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA6 and PA 610) |
| PA 6I/6T | (see PA 6I and PA 6T) |
| PA PACM 12 | diaminodicyclohexylmethane, laurolactam |
| PA 6I/6T/PACM | as PA 6I/6T + diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

The molding composition may optionally comprise component C) from 5 to 95% by weight at least one polyarylene ether sulfone which differs from the at least one PNA with respect to its end groups and possibly also in its structure. For instance it may be preferred that the molding composition comprises (C) from 9.5 to 57% by weight of said polyarylene ether sulfone, whereby it may be more preferred that it comprises (C) from 14 to 49% by weight, such as from 15 to 26.5% by weight of polyarylene ether sulfone. It may even be more preferred that the molding composition comprises (C) from 16 to 26% by weight polyarylene ether sulfone. Thereby the proportions are based on a total of 100% by weight of components (A) to (F).

Said difference may be in percentage of endgroups of formula I. Thus while at least one PNA with a high percentage of endgroups of formula I may be used as component (A) at least one PNA with a lower or low percentage of endgroups of formula I may be used as component (C). It may be preferred that the at least one polyarylene ether sulfone used as component (C) does not have endgroups of formula I. The at least one polyarylene ether sulfone used as component (C) may—except for the amount or the nature of the end groups—be otherwise of the same structural nature or may have a different structure. For instance, the at least one polyarylene ether sulfone used as component (C) may be composed of different repeat units, may have a different repeat unit distribution or differ in molecular weight or molecular weight distribution. Preference may usually be given to at least one polyarylene ether sulfone having a structure which allows it to be miscible with the at least one PNA used as component (A).

Generally, it is preferred that the polyarylether sulfone used as component C is composed of at least one repeat unit of general formula II.

It may be preferred that the polyarylene ether sulfone comprises at least one of the repeat units IIa to IIo. Other units, in addition to the units IIa to IIo that may preferably be present, are those in which one or more 1,4-phenylene units deriving from hydroquinone have been replaced by 1,3-phenylene units deriving from resorcinol, or by naphthylene units deriving from dihydroxynaphthalene.

Units of the general formula II that may be particularly preferred are the units IIa, IIg, and IIk. It may also be particularly preferable that the polyarylene ether sulfone is in essence composed of one type of unit of the general formula II, whereby one type may in particular be selected from IIa, IIg, and IIk.

The polyarylene ether sulfone may particularly preferably be composed of repeat units where Ar is 1,4-phenylene, t is 1, q is 0, T is a chemical bond, and Y is SO2. If this polyarylene ether sulfone does not have any endgroups of formula I is also termed polyphenylene sulfone (PPSU) (formula IIg).

The polyarylene ether sulfone may particularly preferably be composed of repeat units where Ar is 1,4-phenylene, t is 1, q is 0, T is C(CH3)2, and Y is SO2. If this polyarylene ether sulfone does not have any end groups of formula I is also termed polysulfone (PSU) (formula IIa).

The polyarylene ether sulfone may particularly preferably be composed of repeat units where Ar is 1,4-phenylene, t is 1, q is 0, T and Y are SO2. If this polyarylene ether sulfone does not have any end groups of formula I it is also termed polyether sulfone (PESU) (formula IIk).

The molding composition may optionally comprise component (D) from 0 to 70% by weight at least one fibrous or particulate filler. If present it may be preferable that the composition comprises (D) from 10 to 70% by weight. It may be more preferred that it comprises (D) from 10 to 62.5% by weight, such as from 10 to 50% by weight. It may be even more preferred that the molding composition comprises (D) from 12.5 to 40% by weight, Thereby the proportions are based on a total of 100% by weight of components (A) to (F).

The molding composition can in particular comprise at least one particulate or fibrous filler, particular preference may be given to fibrous fillers.

Typically preferred at least one fibrous filler is carbon fiber, potassium titanate whisker, aramid fiber, and generally particularly preferably glass fiber. If at least one glass fiber is used, it can have been equipped with a size, preferably with a polyurethane size, and with a coupling agent, to improve compatibility with the matrix material. The diameter of the at least one carbon fiber and/or glass fiber used is generally in the range from 6 to 20 µm. Component (D) is therefore generally particularly preferably composed of at least one glass fiber.

The form in which the at least one glass fiber is incorporated can either be that of short glass fibers or else that of continuous-filament fibers (rovings). The average length of the at least one glass fiber in the finished injection molding is preferably in the range from 0.08 to 2 mm.

The at least one carbon fiber and/or glass fiber can also be used in the form of textiles, mats, or glass-silk rovings.

Suitable at least one particulate filler may be amorphous silica, carbonate, such as magnesium carbonate and chalk, powdered quartz, mica, various silicates, such as clays, muscovite, biotite, suzoite, tin maletite, talc, chlorite, phlogopite, feldspar, calcium silicates, such as wollastonite, or aluminum silicates, such as kaolin, particularly calcined kaolin.

Generally preferred at least one particulate filler may be those in which at least 95% by weight, preferably at least 98% by weight, of the particles have a diameter (greatest diameter through the geometric center), determined on the finished product, of less than 45 µm, preferably less than 40 µm, where the value known as the aspect ratio of the particles is in the range from 1 to 25, preferably in the range from 2 to 20, determined on the finished product. The aspect ratio is the ratio of particle diameter to thickness (greatest dimension to smallest dimension, in each case through the geometric center).

The particle diameters can by way of example be determined here by recording electron micrographs of thin layers of the polymer mixture and evaluating at least 25 filler particles, preferably at least 50. The particle diameters can also be determined by way of sedimentation analysis, as in Transactions of ASAE, page 491 (1983). Sieve analysis can also be used to measure the proportion by weight of the fillers with diameter less than 40 µm.

The at least one particulate filler may particularly preferably comprise talc, kaolin, such as calcined kaolin, or wollastonite, or a mixture of two or all of said fillers. Among these, particular preference is typically given to talc having a proportion of at least 95% by weight of particles with diameter smaller than 40 µm and with aspect ratio of from 1.5 to 25, in each case determined on the finished product. Kaolin preferably can have a proportion of at least 95% by weight of particles with diameter smaller than 20 µm and preferably can have an aspect ratio of from 1.2 to 20, which in each case is determined on the finished product.

The molding compositions may, if desired, comprise as component (E) at least one impact-modifying rubber. The proportion thereof may be from 0 to 30% by weight. If present it may be in particular from 0 to 25% by weight, whereby it may be more preferably that the molding composition comprises (D) from 0 to 20% by weight, such as from 5 to 15% by weight. It may even be more preferred that the molding composition comprises (D) from 6 to 14 by weight of at least one impact modifying rubber. Thereby the total proportions are based on a total of 100% by weight of components (A) to (F).

Preferred at least one rubber which increases the toughness of molding compositions usually has two significant features: it comprises an elastomeric fraction which has a glass transition temperature below −10° C., preferably below −30° C., and it contains at least one functional group which can interact with the polyamide or the PNA or both. In case it interacts with the PNA it usually also interacts with the polyether sulfone component C. Examples of suitable functional groups are carboxylic acid, carboxylic anhydride, carboxylic ester, carboxamide, carboximide, amino, hydroxyl, epoxy, urethane and oxazoline groups.

Generally preferred at least one functionalized rubber D include functionalized polyolefin rubbers built up from the following components:

d1) from 40 to 99% by weight of at least one alpha-olefin having from 2 to 8 carbon atoms;
d2) from 0 to 50% by weight of a diene;
d3) from 0 to 45% by weight of at least one C1-C12-alkyl ester of acrylic or methacrylic acid, or mixtures of esters of this type;
d4) from 0 to 40% by weight of at least one ethylenically unsaturated C2-C20 mono- or dicarboxylic acid or of a functional derivative of an acid of this type;
d5) from 1 to 40% by weight of at least one monomer containing epoxy groups; and
d6) at least one monomer capable of free-radical polymerization.

Examples of suitable at least one alpha-olefin (d1) are ethylene, propylene, 1-butylene, 1-pentylene, 1-hexylene, 1-heptylene, 1-octylene, 2-methylpropylene, 3-methyl-1-butylene and 3-ethyl-1-butylene. Ethylene and propylene may be preferred.

Examples of suitable at least one diene monomer (d2) are conjugated dienes having from 4 to 8 carbon atoms, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo [5.2.I.02•6]-3,8-decadiene, or mixtures of these. Preference is given to 1,5-hexadiene, 5-ethylidenenorbornene and dicyclopentadiene. The diene content can generally be from 0 to 50% by weight, whereby it may be preferred that it is from 0.5 to 50% by weight, whereby it may be particularly preferably from 2 to 20% by weight and more particularly preferably from 3 to 15% by weight, based on the total weight of the olefin polymer.

Examples of suitable at least one ester (d3) are methyl, ethyl, propyl, n-butyl, isobutyl, 2-ethylhexyl, octyl and decyl acrylates and the corresponding methacrylates. Among these particular preference may be given to methyl, ethyl, propyl, n-butyl and 2-ethylhexyl acrylate and methacrylate.

Instead of the at least one ester (d3), or in addition to these, the olefin polymers may also comprise acid-functional and/or latently acid-functional monomers in the form of at least one ethylenically unsaturated mono- or dicarboxylic acid (d4).

Examples of at least one monomer (d4) are acrylic acid, methacrylic acid, tertiary alkyl esters of these acids, in particular tert-butyl acrylate, and dicarboxylic acids, such as maleic acid and fumaric acid, and derivatives of these acids, and also their half-esters.

For the purposes of the invention, latently acid-functional monomers are those compounds which under the conditions of the polymerization or during incorporation of the olefin polymers into the molding compositions form free acid groups. Examples of these are anhydrides of dicarboxylic acids having from 2 to 20 carbon atoms, in particular maleic anhydride, and tertiary C1-C12-alkyl esters of the above-mentioned acids, in particular tert-butyl acrylate and tert-butyl methacrylate. Ethylenically unsaturated dicarboxylic acids and anhydrides (d4) have the following formulae III and IV:

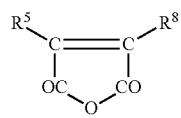

where R5, R6, R7 and R8, independently of one another, are H or C1 to C6-alkyl. Monomers d5 containing epoxy groups have the following formulae V and VI

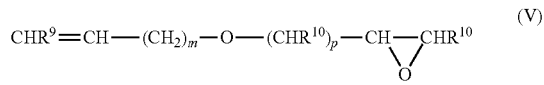

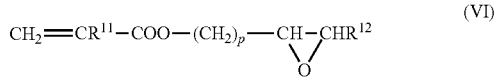

where R9, R10, R11 and R12, independently of one another, are H or C1 to C6-alkyl, m is an integer from 0 to 20, and p is an integer from 0 to 10.

R5 to R12 may preferably be hydrogen, m may preferably be 0 or 1 and p may preferably be 1.

Typically preferred at least one compound (d4) and, respectively, (d5) may be maleic acid, fumaric acid and maleic anhydride and, respectively, alkenyl glycidyl ethers and vinyl glycidyl ether.

Generally particularly preferred compounds of the formulae III and IV and, respectively, V and VI can be maleic acid and maleic anhydride and, respectively, acrylates and/or meth-acrylates both of which contain epoxy groups, in particular glycidyl acrylate and glycidyl methacrylate.

It may be particularly preferred that the at least one olefin polymer are those made from 49.9 to 98.9% by weight, whereby it may in particular be from 59.85 to 94.85% by weight, of ethylene, and from 1 to 50% by weight, in particular from 5 to 40% by weight, of an ester of acrylic or methacrylic acid, and from 0.1 to 20.0% by weight, in particular from 0.15 to 15% by weight, of glycidyl acrylate and/or glycidyl methacrylate, acrylic acid and/or maleic anhydride.

Particularly suitable at least one functionalized rubber (D) may for instance be an ethylene-methyl methacrylate-glycidyl methacrylate polymer, ethylene-methyl acrylategly-cidyl methacrylate polymer, ethylene-methyl acrylate-glycidyl acrylate polymer or an ethylene-methyl methacrylate-glycidyl acrylate polymer or a mixture of these.

Examples of the other at least one monomer (d6) are for instance vinyl esters and vinyl ethers and mixtures of these.

The polymers described above may be prepared by processes known per se or accessible to the person skilled in the art by applying the general knowledge, for instance preferably by random copolymerization at high pressure and elevated temperature.

The melt index of the copolymers may generally be from 1 to 80 g/min 10 min (measured at 190° C. and 2.16 kg load).

Furthermore, functionalized ethylene-α-olefin-copolymers like ethylene-propylene-grafted-maleic anhydride or ethylene-1-butene-grafted maleic anhydride can also be used as impact modifiers.

Core-shell graft rubbers generally are another group of suitable at least one rubber (D). These are graft rubbers which typically can be prepared in emulsion and composed of at least one hard and one soft constituent. Usually, a hard constituent is at least one polymer with a glass transition temperature of at least 25° C., and usually a soft constituent is at least one polymer with a glass transition temperature of not more than 0° C. These products generally have a structure made from a core (graft base) and from at least one shell (graft), and the structure is typically a result of the sequence of addition of the monomers. The soft constituent generally derives from butadiene, isoprene, at least one alkyl acrylate, at least one alkyl methacrylate or at least one siloxane and, if desired, at least one other comonomer. Suitable siloxane cores may be prepared, for example, starting from cyclic oligomeric octamethyltetrasiloxane or from tetravinyltet-ramethyltetrasiloxane. These may, for example, be reacted with y-mercaptopropylmethyldimethoxysilane in a ring-opening cationic polymerization, preferably in the presence of sulfonic acids, to give the soft siloxane core. The at least one siloxane may also be cross-linked by, for example, carrying out the polymerization in the presence of at least one silane having at least one hydrolyzable group, such as halo or alkoxy, for example tetraethoxysilane, methyltrimethoxysilane or phenylt-rimethoxysilane. Examples of suitable at least one comonomer for this are styrene, acrylonitrile and crosslinking or grafting monomers having more than one polymerizable double bond, for example diallyl phthalate, divinylbenzene, butanediol dia-crylate or triallyl (iso) cyanurate. The hard constituent generally derives from styrene, alpha-methylstyrene or from copolymers of these, and it may be preferred that the at least one comonomer here is acrylonitrile, methacrylonitrile or methyl methacrylate.

It may be preferred that the at least one core-shell graft rubber comprises a soft core and a hard shell or a hard core, a first soft shell and at least one further hard shell. The incorporation of at least one functional group here, such as carbonyl, carboxylic acid, anhydride, amide, imide, carboxylic ester, amino, hydroxyl, epoxy, oxazoline, urethane, urea, lactam or halobenzyl, may preferably take place by adding at least one suitably functionalized monomer during the polymerization of the final shell.

Examples of at least one suitable functionalized monomer are maleic acid, maleic anhydride, half-esters or diesters, or maleic acid, tert-butyl (meth)acrylate, acrylic acid, glycidyl (meth-)acrylate and vinyloxazoline. The proportion of the at least one monomer with functional groups is generally from 0.1 to 25% by weight, whereby it may be preferably from 0.25 to 15% by weight, based on the total weight of the core-shell graft rubber. The weight ratio of soft to hard constituents is generally from 1:9 to 9:1, whereby it may be preferably from 3:7 to 8:2.

Rubbers of this type are known per se or accessible to the person skilled in the art by making use of the general knowledge and are described, for example, in EP-A 208 187.

Thermoplastic polyester elastomers are another group of suitable at least one impact modifier. For the purposes of the invention, polyester elastomers are segmented copolyetheresters which typically may comprise long-chain segments generally deriving from poly(alkylene) ether glycols and short-chain segments which typically may derive from low-molecular weight diols and dicarboxylic acids. Products of this type are known per se or accessible to the person skilled of the by application of the general knowledge and are described for example in U.S. Pat. No. 3,651,014. Corresponding products are also available commercially as Hytrel® (Du Pont), Arnitel® (Akzo) and Pelprene® (Toyobo Co. Ltd.).

The molding composition may optionally comprise component (F) from 0 to 40% by weight at least one auxiliary. If present it may be preferable that the composition comprises (F) from 0.5 to 40% by weight. It may be more preferred that it comprises (F) from 10 to 40% by weight, such as from 1 to 20% by weight. It may be even more preferred that the molding composition comprises (F) from 1 to 15% by weight, Thereby the proportions are based on a total of 100% by weight of components (A) to (F).

The at least one auxiliary may in particular be at least one processing aid, pigment, stabilizer, flame retardant, or a mixture of various additives. Other examples of conventional additives are at least one oxidation retarder, agent to counter decomposition by heat and decomposition by ultraviolet light, lubricant and mold-release agent, dye, and plasticizer which may be use alone or in any combination with any other auxiliary.

The amount comprised of at least one pigments and/or at least one dye is generally from 0 to 6% by weight, preferably it may be from 0.05 to 5% by weight, and in particular it may be from 0.1 to 3% by weight, based on the total of the % by weight values for components (A) to (F).

Pigments for the coloring of thermoplastics are well known, see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [$2PbCO_3 \cdot Pb(OH)_2$], lithopones, antimony white, and titanium dioxide. Of the two most familiar crystalline forms of titanium dioxide (rutile and anatase), it is typically in particular the rutile form which is used for white coloring of the molding compositions disclosed. Black color pigments which can be used according to the invention are iron oxide black ($Fe_3O_4$), spinel black [$Cu(Cr, Fe)_2O_4$], manganese black (a mixture composed of manganese dioxide, silicon dioxide, and iron oxide), cobalt black, and antimony black, and also it may be particularly preferably carbon black, which is mostly used in the form of furnace black or gas black. In this connection see G. Benzing, Pigmente für Anstrichmittel [Pigments for paints], Expert-Verlag (1988), pages 78ff.

Particular color shades can for instance be achieved by using inorganic chromatic pigments, such as chromium oxide green, or organic chromatic pigments, such as azo pigments or phthalocyanines. Pigments of this type are known to the person skilled in the art.

Examples of the at least one oxidation retarder and/or the at least one heat stabilizers which can be added to the molding composition are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of said group, secondary aromatic amines, if appropriate in combination with phosphorus-containing acids, or to use their salts, or a mixture of said compounds, preferably in concentrations up to 1% by weight, based on the total of the % by weight values for components (A) to (F).

Examples of the at least one UV stabilizer are various substituted resorcinols, salicylates, benzotriazoles, and benzophenones, the amounts generally used of these being up to 2% by weight, based on the total of the % by weight values for components (A) to (F).

At least one lubricant and/or at least one mold-release agent, the amounts of which added may generally be up to 1% by weight, based on the total of the % by weight values for components (A) to (F), are for example stearyl alcohol, alkyl stearates, and stearamides, and also esters of pentaerythritol with long-chain fatty acids. It is also possible to use dialkyl ketones, such as distearyl ketone.

It can be preferable that the molding composition comprises from 0.1 to 2% by weight, whereby it may be more preferably from 0.1 to 1.75% by weight, particularly preferably it may be from 0.1 to 1.5% by weight and in particular it may be from 0.1 to 0.9% by weight (based on the sum of the % by weight values of components (A) to (F)) of stearic acid and/or of stearates. In principle it is also possible to use other stearic acid derivatives, for example esters of stearic acid.

Stearic acid is preferably produced via hydrolysis of fats. The products thus obtained are usually mixtures composed of stearic acid and palmitic acid. These products therefore have a wide softening range, for example from 50 to 70° C., as a function of the constitution of the product. Preference may be given to using products with more than 20% by weight content of stearic acid, particularly preferably more than 25% by weight. It is also possible to use pure stearic acid (more than 98% by weight).

Component (F) can moreover also include stearates. Stearates can be produced either via reaction of corresponding sodium salts with metal salt solutions (e.g. $CaCl_2$), $MgCl_2$, aluminum salts) or via direct reaction of the fatty acid with metal hydroxide (see for example Baerlocher Additives, 2005). It is typically preferable to use aluminum tristearate.

Further at least one additive that can be used are also those known as nucleating agents, an example being talc powder.

| Composition Number | Component A* Amount [% by wt] | Component B Type | Component B Amount [% by wt] | Component C Type | Component C Amount [% by wt] | Component D** Amount [% by wt] | Component E*** Amount [% by wt] | Component F Type | Component F Amount [% by wt] |
|---|---|---|---|---|---|---|---|---|---|
| 1 | 5 to 95 | | 0 | PESU | 5 to 95 | 0 | 0 | | 0 |
| 2 | 5 to 50 | PA 9T | 25 to 50 | PESU | 5 to 70 | | | | |
| 3 | 5 to 50 | PA 6T66 | 25 to 50 | PESU | 5 to 70 | | | | |
| 4 | 5 to 50 | PA 6T6I | 25 to 50 | PESU | 5 to 70 | | | | |
| 5 | 5 to 50 | | | PESU | 35 to 85 | 10 to 60 | | | |
| 6 | 5 to 50 | PA 9T | 5 to 70 | PESU | 15 to 80 | 10 to 62.5 | | | |
| 7 | 5 to 50 | PA 9T | 5 to 60 | PESU | 30 to 85 | | 5 to 25 | | |
| 8 | 5 to 50 | PA 9T | 5 to 60 | PESU | 10 to 69.9 | 20 to 60 | | Pigment | 0.1 to 3 |
| 9 | 5 to 50 | PA 9T | 5 to 60 | PPSU | 10 to 69.9 | 20 to 60 | | Pigment | 0.1 to 3 |
| 10 | 5 to 50 | PA 9T | 5 to 60 | PESU | 30 to 84.9 | | 5 to 25 | Pigment | 0.1 to 3 |
| 11 | 5 to 50 | PA 9T | 5 to 60 | PESU | 10 to 69.8 | 20 to 60 | | Pigment | 0.1 to 3 |
| | | | | | | | | Heat-Stabilizer | 0.1 to 2 |

*PESU-NA comprising 30 to 40% NA endgroups
**E-Glass fiber
***EB-g-MAH

Components (A) to (F) can be mixed in any desired sequence.

The molding composition can be produced by processes known to the person skilled in the art or accessible to him by general knowledge, for example extrusion. The molding composition can by way of example be produced by mixing the starting components in at least one conventional mixing apparatus, such as screw-based extruder, preferably twin-screw extruder, Brabender mixer, or Banbury mixer, or else kneader, and then extruding it. The extrudate is typically cooled and comminuted. The sequence of the mixing of the components can be varied, and it is therefore possible to mix two or more than two components in advance, but it is also possible to mix all of the components together.

In order to obtain a mixture with maximum homogeneity, intensive and thorough mixing is generally advantageous. Average mixing times needed for this are generally from 0.2 to 30 minutes at temperatures of from 290 to 380° C., preferably it may be from 300 to 370° C. The extrudate is generally cooled and granulated.

The thermoplastic molding composition can advantageously be used for the manufacture of a fiber, film, foam or shaped article. Due to the good current tracking index the molding composition is generally particularly suitable for producing electric or electronic components. As the molding composition has a high temperature resistance and good chemical resistance they may in particular lend itself for the production of electric or electronic components, which are exposed to elevated temperatures and/or chemicals. Generally, the products which may be obtained from the molding composition can be industry items such as in the vehicle sector e.g. in automobiles or planes. Likewise, they may be household items such as appliances or items with food contact. Furthermore, battery housings, parts for plumbing, energy absorbing foams can also be produced with the molding composition.

EXAMPLES

The examples below provide further explanation of the invention, but do not restrict the same.
Components of the Molding Compositions
Component A1
The preparation of the polyether sulfone comprising end groups of formula I (PESU-NA) was carried out according to the following procedure:

In a vessel equipped with a stirrer, Dean-Stark-trap, nitrogen-inlet and temperature control, 278.27 g (0.969 mol) 4,4'-dichlorodiphenylsulfone (DCDPS), 250.17 g (1.00 mol) 4,4'-dihydroxydiphenylsulfone (DHDPS), and 152.03 g (1.10 mol) potassium carbonate (particle size 39.3 μm) was suspended under nitrogen atmosphere in 1000 ml NMP. Under stirring the mixture was heated up to 190° C. 30 l/h Nitrogen is purged through the mixture and the mixture is kept at 190° C. for 6 h. After that time 15.34 g (0.066 mol) 4-Chloro-1,8-naphthalic anhydride dissolved in NMP (10%) are added at 190° C. and the reaction continues for another 2 h. After this time 500 ml NMP are added to cool down the mixture. Under nitrogen the mixture is allowed to cool down below 60° C. After filtration the polymer solution is precipitated in water. The precipitated product is extracted with hot water (20 h at 85° C.) and dried at 120° C. for 24 h under reduced pressure.

The V.N. of the product was 54.7 ml/g, the amount of NA-endgroups 35% (determined by 1H-NMR).
Component AV
Polyethersulfone prepared according to the process given in example 1 of WO97/04018, having a V.N of 50.2 ml/g and 0.65 wt.-% phthalic anhydride-endgroups, which corresponds to 37% PhA-endgroups.
Component B
As component B a Polyamide 9T with a viscosity number of 120 ml/g (measured at 25° C. in conc. $H_2SO_4$) was used.
Component C
As component C a polyether sulfone (PESU) having a viscosity number of 49.0 ml/g was used. The used product had 0.19 wt.-% Cl-endgroups and 0.23 wt.-% $OCH_3$-Endgroups (1H-NMR).
Component D
Glass fibres, chopped strands (length 4.5 mm) with a diameter of 10 μm and a PU-based sizing.
Component E
Impact modifier based on polyethylene-co-1-butene, grafted with maleic acid/maleic anhydride, having a MVR-value (190° C./2.16 kg) of 0.97 ml/10'.
Component F1
4,4"-Bis(α,α-dimethylbenzyl)diphenyl-amine, melting point 98-100° C.
Component F2
Sodiumhypophosphite Production and Testing of the Molding Compositions Compounding was done using a twin screw extruder (ZSK 30), the barrel temperatures were set to keep the melt temperature below 350° C. Molding of the test samples was done at a melt temperature of 340° C. and a mold temperature of 120° C. Tensile testing was done according to DIN EN ISO 527-1 (Juni 2012) (E-Modulus, strength, tensile elongation). Impact strength was tested according to DIN EN ISO 179 1eU (June 2012), while notched impact was tested according to DIN EN ISO 179 1eA (June 2012). The viscosity of the melt was tested according by MVR-measurements (DIN EN ISO 1133-1 (March 2012), 360° C./5 kg).

The CTI was measured according to IEC 60112 (January 2003) on samples having a thickness of 4 mm.

To assess the chemical resistance of the compounds, pieces of a molded sample (2 g) were placed in 100 ml N-methyl-pyrrolidone (NMP) at 23° C. for 48 h. After that time the non-soluble material was filtered of, washed carefully with another 250 ml NMP, then dried for 24 h in the vacuum to determine the part of non-soluble material.

The solution viscosity (V.N.) of the PNA was determined using a solution of 0.01 g/ml in N-Methylpyrrolidone at 25° C. (DIN EN ISO 1628-1 (October 2012)).

The results of the experiments are shown in Table 1.

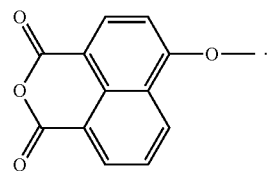

(I)

2. The polyarylene ether sulfone of claim 1, comprising at least 15% of the endgroups.

3. The polyarylene ether sulfone of claim 1, comprising from 25% to 90% of the endgroups.

4. The polyarylene ether sulfone of claim 1, further comprising repeat units of formula II:

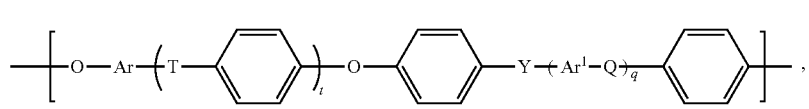

(II)

wherein t and q are independently 0 or 1 or 2 or 3,

Q, T and Y are independently a chemical bond or group selected from the group consisting of —O—, —S—, —SO2-, S═O, C═O, —N═N—, and —CRaRb—, where wherein Ra and Rb are independently a hydrogen atom, a C1-C12-alkyl, C1-C12-alkoxy, or C6-C18-aryl group, and wherein at least one of Q, T, and Y is —SO2-, and Ar and Ar1 are independently an arylene group having from 6 to 18 carbon atoms.

TABLE 1

| Example | C1* | 2** | C3 | 4 | 5 | C6 | 7 | C8 | 9 | C10 |
|---|---|---|---|---|---|---|---|---|---|---|
| A1 | — | 25 | — | 35 | 17.5 | — | 25 | — | 16.25 | — |
| AV | — | — | — | — | — | — | — | — | — | 16.25 |
| B | 50 | 25 | 70 | 35 | 52.5 | 50 | 25 | 32.5 | 16.25 | 16.25 |
| C | 49.33 | 49.33 | 29.58 | 29.58 | 29.58 | 44.58 | 44.58 | 32.08 | 32.08 | 32.08 |
| D | — | — | — | — | — | — | — | 45 | 45 | 45 |
| E | — | — | — | — | — | 5 | 5 | — | — | — |
| F1 | 0.65 | 0.65 | 0.4 | 0.4 | 0.4 | 0.4 | 0.4 | 0.4 | 0.4 | 0.4 |
| F2 | 0.02 | 0.02 | 0.02 | 0.02 | 0.02 | 0.02 | 0.02 | 0.02 | 0.02 | 0.02 |
| ISO 179 1eU [kJ/m$^2$] | 102 | 370 | 150 | >400 | >400 | 167 | >400 | 37 | 63 | 54 |
| ISO 179 1eA [kJ/m$^2$] | 3.4 | 6.8 | 4.6 | 7.5 | 7.1 | 4.2 | 8.9 | 7.4 | 9.5 | 9.1 |
| CTI | 175 | 250 | 150 | 225 | 225 | 175 | 250 | 250 | 275 | 225 |
| Non-sol. part [wt. %] | 49.7 | 63.7 | 29.8 | 35.1 | 33.1 | 49.2 | 61.8 | 77.2 | 81.2 | 80.1 |

*Comparative examples
**Examples according to the invention

The compositions according to the invention show an improved mechanical performance and surprisingly superior CTI-values.

The invention claimed is:

1. A polyarylene ether sulfone comprising endgroups of formula I:

5. The polyarylene ether sulfone of claim 1, further comprising at least one of formula:

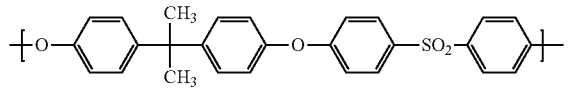

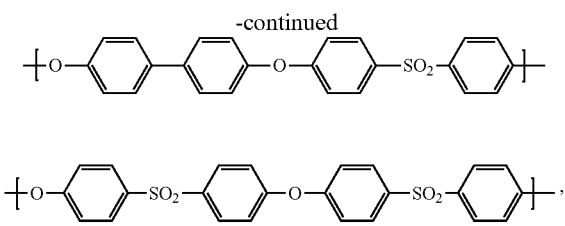

as repeat units.

6. A process for manufacturing a polyarylene ether sulfone comprising endgroups of formula I:

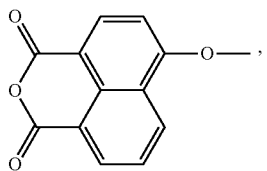

(I)

the process comprising:
reacting a polyarylene ether sulfone comprising phenolate endgroups with 4-chloro-1,8-naphthalic acid anhydride.

7. A process for manufacturing a polyarylene ether sulfone comprising endgroups of formula I

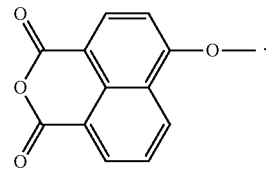

(I)

the process comprising:
reacting polyarylene ether sulfone forming monomers with 4-chloro-1,8-naphthalic acid anhydride.

8. A molding composition comprising the polyarylene ether sulfone of claim 1.

9. A fiber, film or shaped article comprising the molding composition of claim 8.

* * * * *